(12) United States Patent
Roy et al.

(10) Patent No.: US 12,593,213 B2
(45) Date of Patent: Mar. 31, 2026

(54) DETECTION AND MITIGATION PLAN FOR THE EXTERNAL THREATS ON 5G NETWORK/DEVICES WHILE USING NETWORK FUNCTIONS VIRTUALIZATION (NFV)

(71) Applicant: Dell Products L.P., Round Rock, TX (US)

(72) Inventors: Mainak Roy, Bangalore (IN); Navya Valliyodan, Kannur (IN)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 18/484,360

(22) Filed: Oct. 10, 2023

(65) Prior Publication Data

US 2025/0119747 A1     Apr. 10, 2025

(51) Int. Cl.
*H04W 12/122*          (2021.01)
(52) U.S. Cl.
CPC ................................. *H04W 12/122* (2021.01)
(58) Field of Classification Search
CPC . H04W 12/108; H04W 12/12; H04W 12/121; H04W 12/122; H04W 12/14; G06F 21/554; G06F 21/552; H04L 63/1433; H04L 63/145
See application file for complete search history.

(56) References Cited

U.S. PATENT DOCUMENTS

| | | | | |
|---|---|---|---|---|
| 7,069,594 | B1 * | 6/2006 | Bolin ...................... | G06F 21/57 |
| | | | | 726/26 |
| 7,246,227 | B2 * | 7/2007 | Kissel ................... | G06F 21/562 |
| | | | | 726/13 |
| 7,853,999 | B2 * | 12/2010 | Khilnani ............... | G06F 21/567 |
| | | | | 726/16 |
| 9,251,350 | B2 * | 2/2016 | Khilnani ................. | G06F 21/00 |
| 9,258,321 | B2 * | 2/2016 | Amsler ............... | H04L 63/1425 |
| 9,509,713 | B2 * | 11/2016 | Bennett ................... | G06F 21/51 |
| 10,437,997 | B2 * | 10/2019 | Friedrichs ............... | G06F 16/13 |
| 10,902,120 | B2 * | 1/2021 | Coronado ............. | G06F 21/566 |
| 11,803,646 | B2 * | 10/2023 | Shivanna ............. | G06F 21/577 |

OTHER PUBLICATIONS

CISCO, SNORT: Open Source Intrusion Prevention System (IPS) website, https://www.snort.org/, Mar. 1, 2023.

* cited by examiner

*Primary Examiner* — Hosuk Song
(74) *Attorney, Agent, or Firm* — Workman Nydegger

(57)          ABSTRACT

One example method includes receiving a request to scan a file, storing the file, performing a vulnerability scan on the file, based on an outcome of the vulnerability scan, making a copy of the file, scanning the copy of the file, when the scanning identifies an attack pattern, applying a rule concerning the attack pattern, and performing a remedial action specified by the rule with respect to the file and/or with respect to a device that handled the file.

20 Claims, 14 Drawing Sheets

5G Security threats
- Virtualization vulnerabilities
- Denial-of-Service (DoS) attack
- DDOS attack
- Lawful Interception Attack
- OSS/BSS attack
- Injection attack
- DNS Amplification Attack

104

5G network capabilities
- The spirit of open source is being championed by initiatives like OpenRAN
- Multiple device connectivity to the network
- Separating the hardware and software components of the network and introducing virtualization and cloud computing
- Network slicing

102

Reasons for attack
- Lack of baked-in cybersecurity in the devices
- Open architecture vulnerability
- Virtualization lacks security mechanism
- NFV changes the network security environment due to resource pools based on cloud computing and open network architecture

106

RESOURCE LINK ───────────

USER PLANE - USER PLANE ENTITY ─ · ─ · ─

CONTROL PLANE - CONTROL PLANE ENTITY ── ── ──

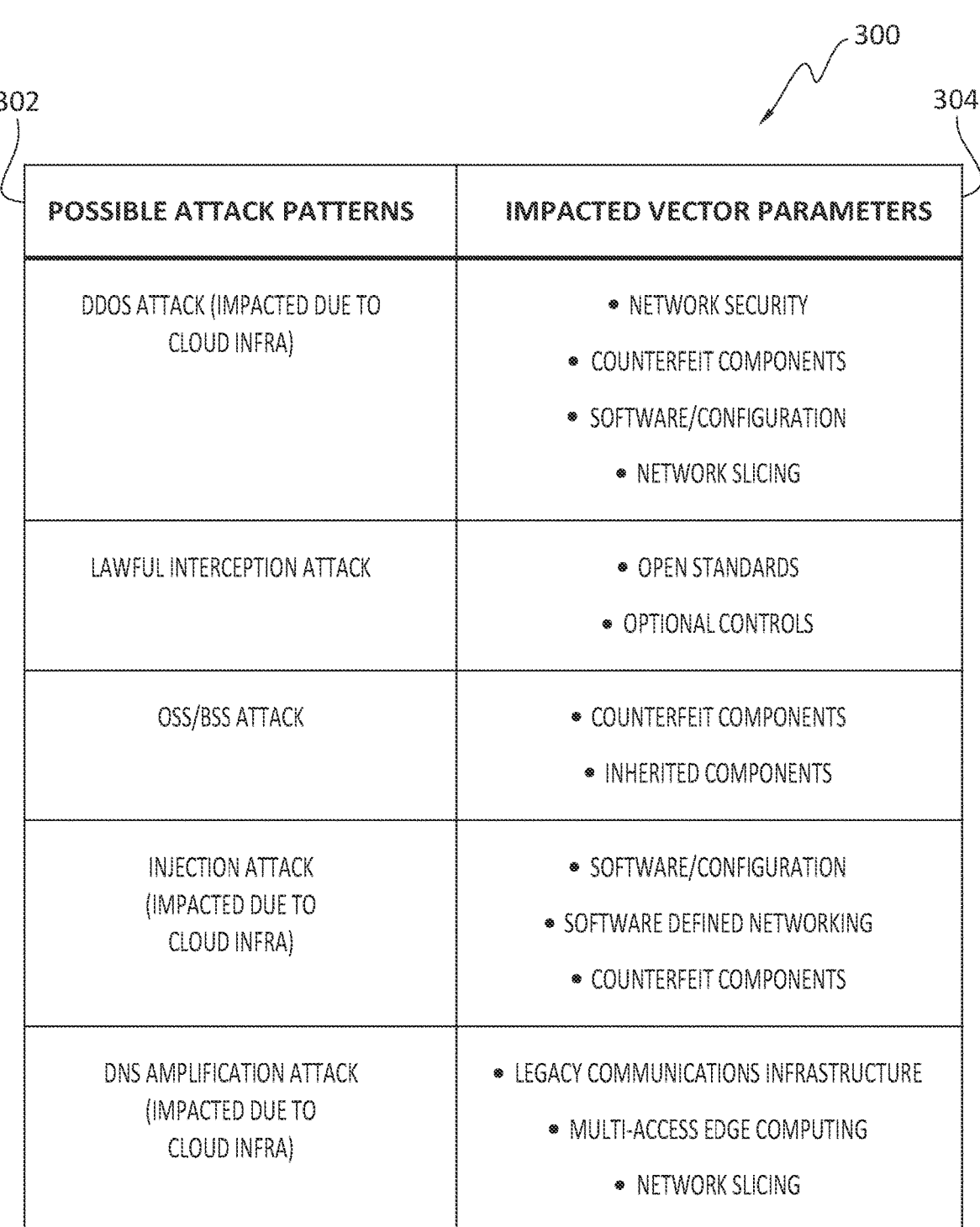

| POSSIBLE ATTACK PATTERNS | IMPACTED VECTOR PARAMETERS |
|---|---|
| DDOS ATTACK (IMPACTED DUE TO CLOUD INFRA) | • NETWORK SECURITY<br>• COUNTERFEIT COMPONENTS<br>• SOFTWARE/CONFIGURATION<br>• NETWORK SLICING |
| LAWFUL INTERCEPTION ATTACK | • OPEN STANDARDS<br>• OPTIONAL CONTROLS |
| OSS/BSS ATTACK | • COUNTERFEIT COMPONENTS<br>• INHERITED COMPONENTS |
| INJECTION ATTACK (IMPACTED DUE TO CLOUD INFRA) | • SOFTWARE/CONFIGURATION<br>• SOFTWARE DEFINED NETWORKING<br>• COUNTERFEIT COMPONENTS |
| DNS AMPLIFICATION ATTACK (IMPACTED DUE TO CLOUD INFRA) | • LEGACY COMMUNICATIONS INFRASTRUCTURE<br>• MULTI-ACCESS EDGE COMPUTING<br>• NETWORK SLICING |

FIG. 3

WEB SERVICES

RESOURCE LINK

USER PLANE - USER PLANE ENTITY

CONTROL PLANE - CONTROL PLANE ENTITY

700

| 702 | 704 | 706 | 708 | 710 |
| DEVICE DETAILS | THREAT TYPES | TIME | OCCURRENCE | DEVICE STATUS |
| --- | --- | --- | --- | --- |
| 193.165.236.225 | /transport/bst/accelerator | 5/2/2023, 7:55PM | Single | Failed |
| 49.207.60.208 | /deploy/ms/.../call_connect | 5/2/2023, 8:15PM | Multiple | Failed |
| 86.102.193.142 | /host_name/device_call/.../timeout | 5/2/2023, 8:39PM | Single | Running |
| 49.207.60.248 | /receive/bst/.../video_data | 5/2/2023, 8:45PM | Multiple | Failed |
| 122.177.163.88 | /send_video/bst/.../video_data | 5/2/2023 8:57PM | Multiple | Running |

FIG. 7

| 84.18.119.106 | /index.php?cat=[%2f*%2fsElECt+1+%2f*%2ffRoM[%2f***%2fsElECt+count(*),%2f*%2fcOnCaT[([%2f*%2fsElECt+[%2f*%2f*%2fcOnCaT[(0x217e21,%2f***%2fvErSiOn[],0x217 |
|---|---|
| 84.18.119.106 | /index.php?cat=[%2f***%2fsElECt+1+%2f***%2ffRoM[%2f***%2fsElECt+count(*),%2f***%2fcOnCaT[([%2f***%2fsElECt+[%2f***%2f***%2fcOnCaT[(0x217e21,%2f***%2fvErSiOn[],0x217 |
| 84.18.119.106 | /index.php?cat=[%2f***%2fsElECt+1+%2f***%2ffRoM[%2f***%2fsElECt+count(*),%2f***%2fcOnCaT[([%2f***%2fsElECt+[%2f***%2f***%2fcOnCaT[(0x217e21,%2f***%2fvErSiOn[],0x217 |
| 84.18.119.106 | /index.php?cat=[%2f***%2fsElECt+1+%2f***%2ffRoM[%2f***%2fsElECt+count(*),%2f***%2fcOnCaT[([%2f***%2fsElECt+[%2f***%2f***%2fhuNhEx[%2f***%2fhEx[%2f***%2fcOnCaT[0x21 |

FIG. 8A

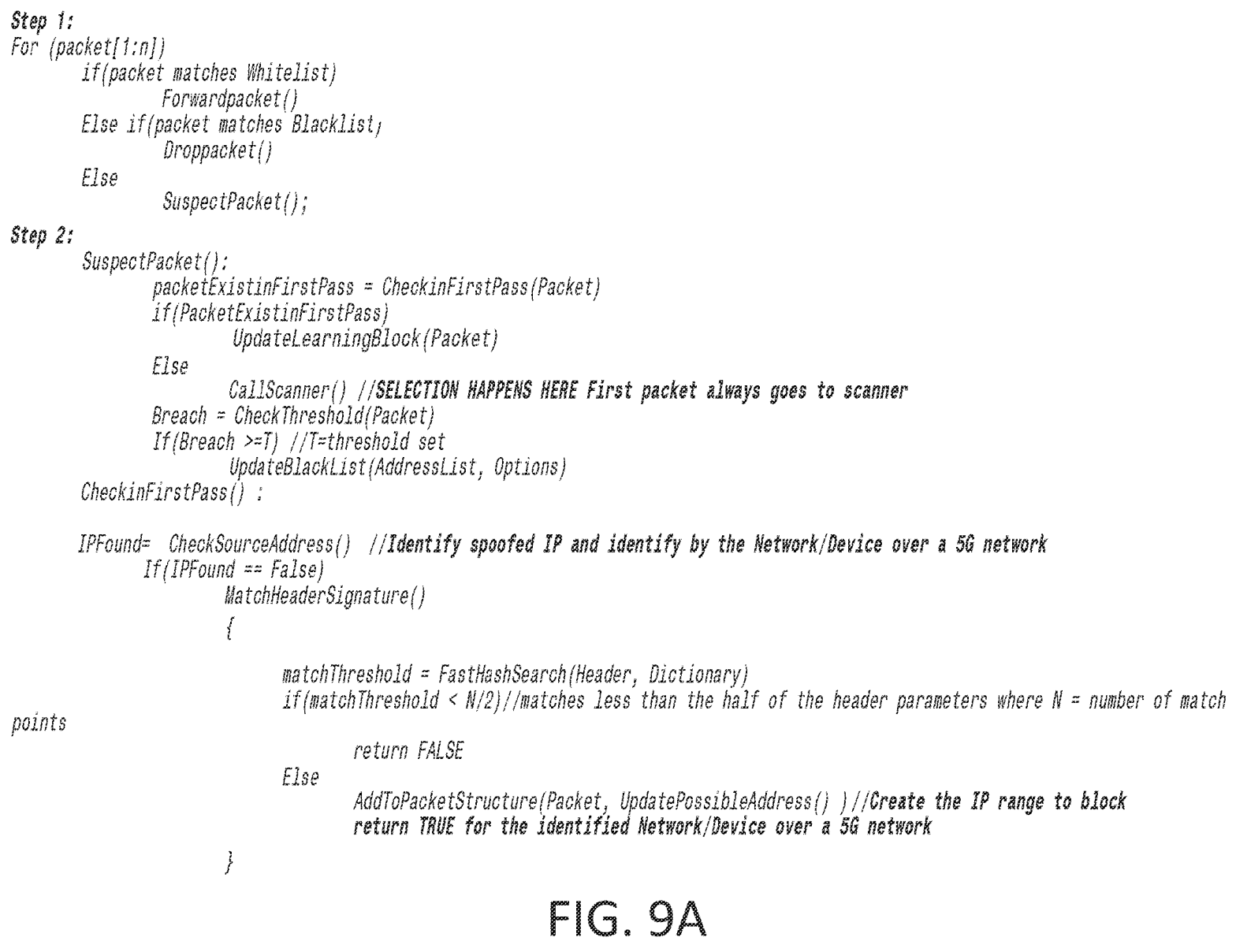

```
Step 1:
For (packet[1:n])
    if(packet matches Whitelist)
        Forwardpacket()
    Else if(packet matches Blacklist)
        Droppacket()

Else    SuspectPacket();

Step 2:
    SuspectPacket():
        packetExistinFirstPass = CheckinFirstPass(Packet)
        if(PacketExistinFirstPass)
            UpdateLearningBlock(Packet)

Else    CallScanner() //SELECTION HAPPENS HERE First packet always goes to scanner
        Breach = CheckThreshold(Packet)
        If(Breach >=T) //T=threshold set
            UpdateBlackList(AddressList, Options)

CheckinFirstPass():

IPFound= CheckSourceAddress()  //Identify spoofed IP and identify by the Network/Device over a 5G network
        If(IPFound == False)
            MatchHeaderSignature()
            {
                matchThreshold = FastHashSearch(Header, Dictionary)
                if(matchThreshold < N/2)//matches less than half of the header parameters where N = number of match
points
                    return FALSE Else    AddToPacketStructure(Packet, UpdatePossibleAddress() )//Create the IP range to block
                    return TRUE for the identified Network/Device over a 5G network
            }
}
```

FIG. 9A

```
Step 3:
    CallScanner();
protocolfound = DetermineProtocol(packet, protocol);
If(protocolfound)
    Proto_dictionary = LoadDictionary(protocol);
for (items in Proto dictionary)
    SignatureMatch = Match_Signature();
    If(SignatureMatch)
            UpdateLearningBlock(Packet, Signature)
            break
    else
        continue
    else
            UpdateLearningBlock(Packet, PROTO_ANY) //protocol not recognized treat as SUSPECT packet Step 4:  //Learn Packet Characteristics and update current state parameters; fault detection and confirmation UpdateLearningBlock(Packet, Options):

InitializeStructures(Options)  //Create state structures based on known protocols or proto_any
    Packet Header Dictionary = ParsePacket()
    Structure_ID = UpdateStucture(Packet Header Dictionary)
    BindToTimer(Structure ID, Time_T)  //is it really a sweep attack UpdateStructure:
    ParsePacketHeader()

Match = Match_in PacketDictionary()
    If(Match)
        ManagePacketOrder()  // Learn packet ordering
        CheckIPParameters()  //Check for IP header parameters
        LearnChangedParameters()  //Update States per packet identifier
        K = Match-with-IP-AttackRules()  //K= number of IP rule violations
        n = number of occurrence  //n= how many times the threat occurred over that Network/device since the detection
        Packet_Header_Dictionary[Structure_ID].Threshold++  //increment threshold
```

FIG. 9B

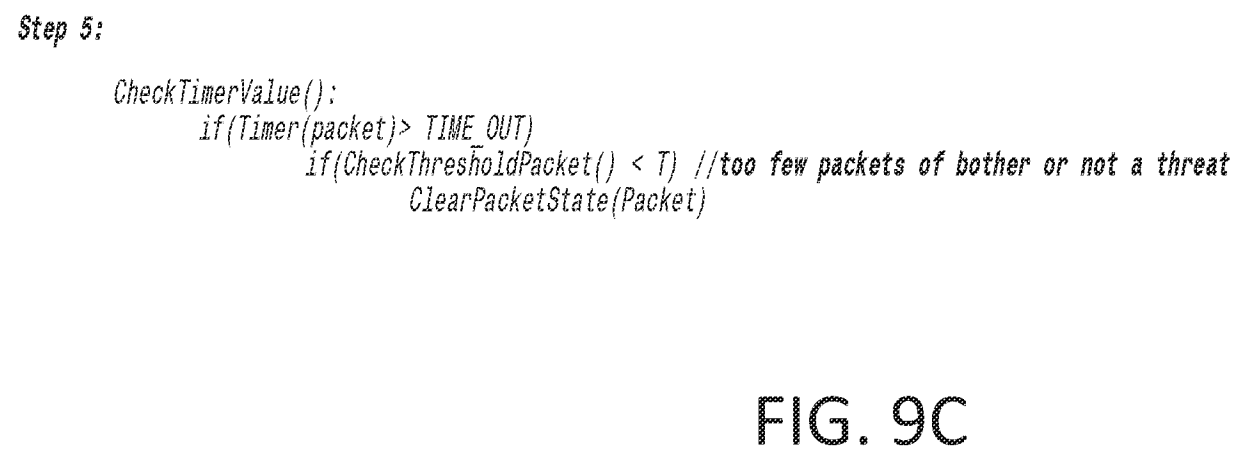

```
Step 5:
    CheckTimerValue():
        if(Timer(packet)> TIME_OUT)
            if(CheckThresholdPacket() < T) //too few packets of bother or not a threat
                ClearPacketState(Packet)
```

FIG. 9C

DETECTION AND MITIGATION PLAN FOR THE EXTERNAL THREATS ON 5G NETWORK/DEVICES WHILE USING NETWORK FUNCTIONS VIRTUALIZATION (NFV)

FIELD OF THE INVENTION

Embodiments of the present invention generally relate to mitigation of external attacks in communication networks. More particularly, at least some embodiments of the invention relate to systems, hardware, software, computer-readable media, and methods, for safeguarding networks, such as an NFV (network functions virtualization) 5G network for example, from external threats.

BACKGROUND

The enhanced connection capabilities of 5G networks lead to wider network and multi-device connectivity, which imposes security vulnerabilities and creates a larger potential attack surface. In a 5G network, for example, Network Virtualization (NV) provides a dynamic system that eliminates the need for human intervention to manage and configure the hardware, this may be referred to as detached control. Network Functions Virtualization (NFV) introduces additional security challenges.

For example, because of resource pools based on cloud computing and open network architecture, NFV alters the network security environment. The connected network/devices will have their own security features, but there is no assurance that the network/devices will adhere to the NFV requirements. Imagine, for example, an existing BT (base station) where there are components installed from multiple different vendors over a period of 20-30 years. In such circumstances, there is no assurance that the newly deployed NFV features will give them enough protection from the advanced threats and vulnerabilities. Finally, it may not be desirable or practical to remove those older components just to ensure NFV acceptance.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 comprises a list of various external attack patterns and vector parameters.

FIG. 7 discloses aspects of a learning and updating pattern matching approach, according to an embodiment.

FIG. 8a discloses an example of a pattern analyzed by an RMM according to one embodiment.

FIGS. 9a, 9b, and 9c, collectively disclose an algorithm according to one embodiment.

DETAILED DESCRIPTION OF SOME EXAMPLE EMBODIMENTS

Figure 1:
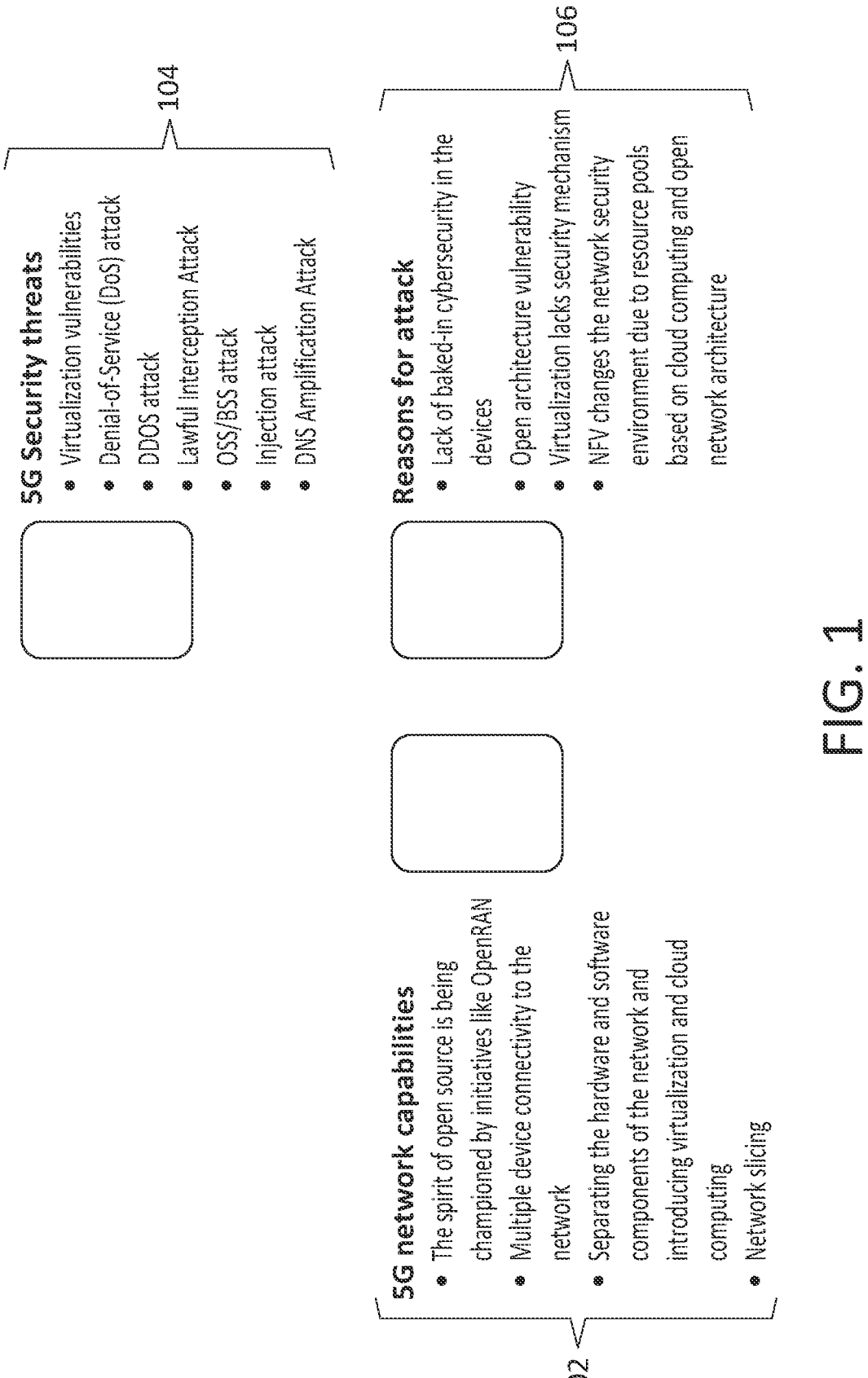
FIG. 1 discloses aspects of an operating environment in which an embodiment may be employed.

Embodiments of the present invention generally relate to mitigation of external attacks in communication networks. More particularly, at least some embodiments of the invention relate to systems, hardware, software, computer-readable media, and methods, for safeguarding networks, such as an NFV (network functions virtualization) 5G network for example, from external threats.

In one example embodiment, a method is provided for out-of-band (OOB) scanning of web server files and providing alerts based on rules and specific actions on files which may have been compromised. The method may be implemented in whole or in part by a risk mitigator module (RMM), which may be hosted so as to provide its functionality 'as-a-Service' (aaS) to clients.

In an embodiment, the RMM may inform, through an authenticated request, to copy the necessary files, for further scanning, which are showing signs of any abnormal behavior/raising alerts/failing an operation. As well, the RMM may send GET requests to check for any injection responses over a pass-through channel. When a request is received for a file scan, the web page files may be stored in an OOB storage for monitoring system, along with the user access and error logs. The OOB storage may also contain the pristine files, which may be referred to herein as 'clean gold files,' to check for changes, and determine if the files are compromised. A vulnerability scanner of the RMM may inject various SQL, PHP and base64 encoded code and emulate a hacking session which had been carried out in the past. Further, a file scanner of the RMM may check first for the access and error files. As well, the file scanner may match some of the attack vectors from a signature DB (database) which are associated with GET/POST/PATCH requests. A pattern scanner of the RMM checks for modified attack vectors with the learning DB. The learning DB may be continuously appended with changing patterns. An Analytics engine of the RMM may take a call on the update of the learning DB. Finally, a rules and actions engine of the RMM may handle the notifications and requirement of quarantining any suspect files. In extreme cases, this can initiate the host to shut down web server services for a particular targeted device.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that network threats can be analyzed out-of-band at a trust boundary outside of a communication network, and mitigated, before they present a threat to the actual communication network. AN embodiment may provide protection against hacking and other attacks even in communication networks that include both legacy equipment and systems, and more modern equipment and systems such as NFV. Various other advantages of one or more embodiments will be apparent from this disclosure.

a. Context for an Example Embodiment

A.1 NFV Attacks

Typical communication systems, including 5G systems, may be the subject of a variety of different types of NFV attacks. This may be due in part to the relatively large attack surface provided by NFV, and/or due to other features and characteristics of communication networks. Examples of such features and characteristics include, but are not limited to: software-based virtual systems-third-party access; resource pooling, live migration, and multi-tenant common infrastructure are exposed to attacks; open architecture; open source-vendor rely-no assurance of security by design or prevention of threats; leveraging commercial off-the-shelf (COTS) hardware; incorporating NFV components into legacy devices; chances of exploitation of API; usage of network slicing-replacing network functions with instances of virtualized software; and, untrusted or forged components within the 5G supply chain.

NFV attacks may originate from a variety of sources. For example, NFV attacks may come from within an NFV (internal weakness), or from outside an NFV (external threat). Further, NFV attacks may occur between NFV components (migration of an attack). One example embodiment may be particularly concerned with the external threats, and may be able to identify the possible attack patterns and associated vector parameters, where the initiation of these attacks are coming from outside networks.

In connection with the foregoing, there are various 5G-related threat vectors. One of these concerns policies and standards-here, an attack may attempt to exercise unwarranted influence on standards and impact customer rights. Another such threat vector is a supply chain—in this case, the attack may take the form of the exploitation of information and communications technologies (ICTs). A final example of such a threat concerns a system architecture—in this case, the attack may take the form of exploitation of traditional and new vulnerabilities-based on the lack of a security mechanism.

With reference briefly to FIG. 1, various considerations relating to 5G networks, in connection with which an embodiment of the invention may be implemented, are indicated. In general, these include 5G network capabilities 102, 5G security threats 104, and reasons for attack 106. These various considerations are addressed in further detail elsewhere herein.

A.2 5G Networks

Figure 2:
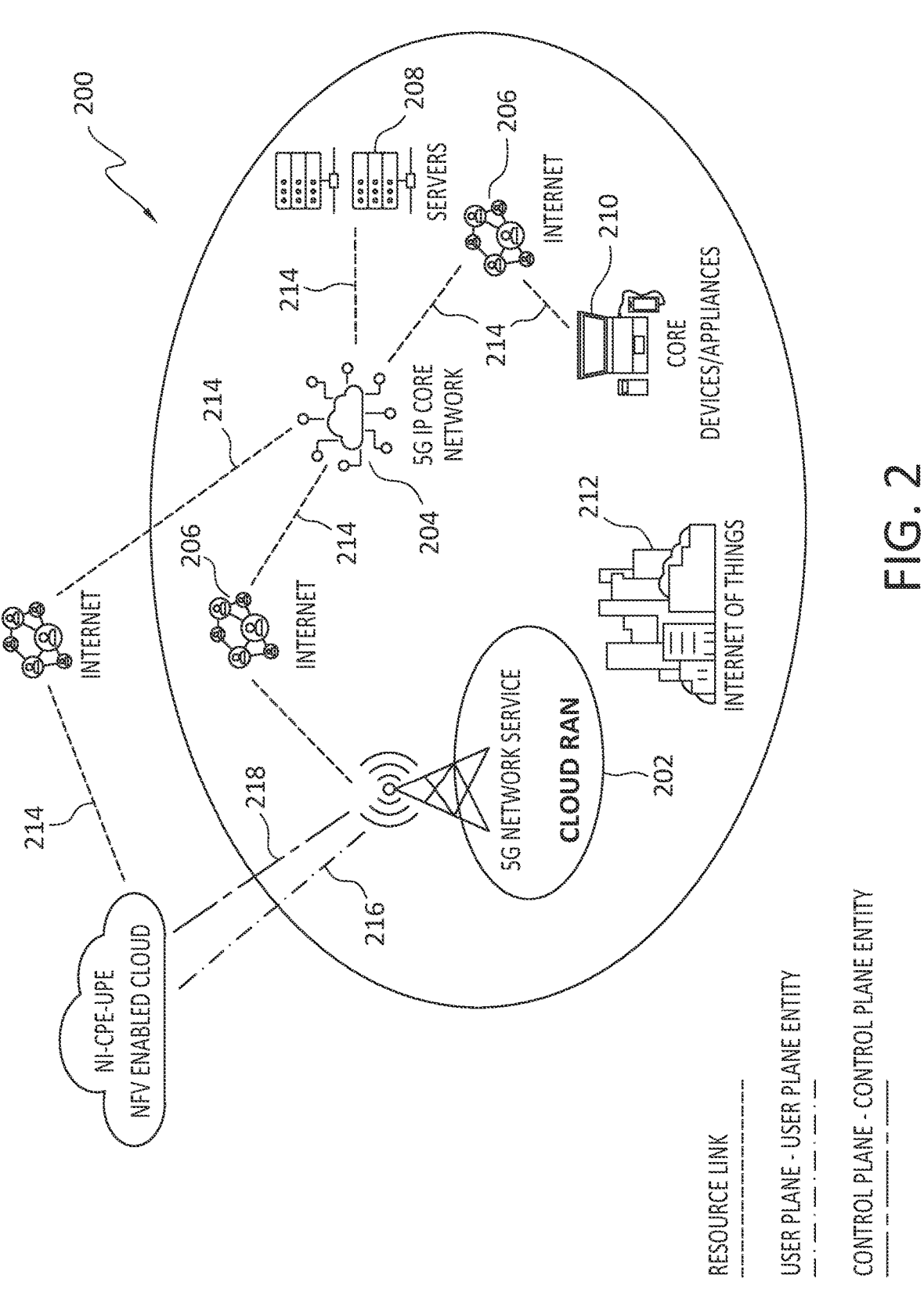
FIG. 2 discloses aspects of a 5G communication network, including connections and communication channels.

With attention now to FIG. 2, aspects of an example 5G network 200, in connection with which an embodiment may be implemented, are disclosed. As shown, the 5G network may comprise, and communicate with, various entities. These include, for example, a cloud RAN (radio access network) 202, 5G IP core network 204, the Internet 206, various servers 208, core devices and appliances 210, and IoT (internet of things) devices 212. In terms of connections and communication channels, the example of FIG. 2 comprises one or more resource links 214, one or more user plane/user plane entities 216, and one or more control plane/control plane entities 218.

A.3 External Attack Patterns and Vector Parameters

With attention now to FIG. 3, a table 300 is disclosed that identifies various example attack patterns 302, and vector parameters 304 impacted by the indicated attack patterns 302. Any one or more of these attack patterns 302 and vector parameters 304 may be addressed, and resolved, by an embodiment of the invention.

Figure 4:
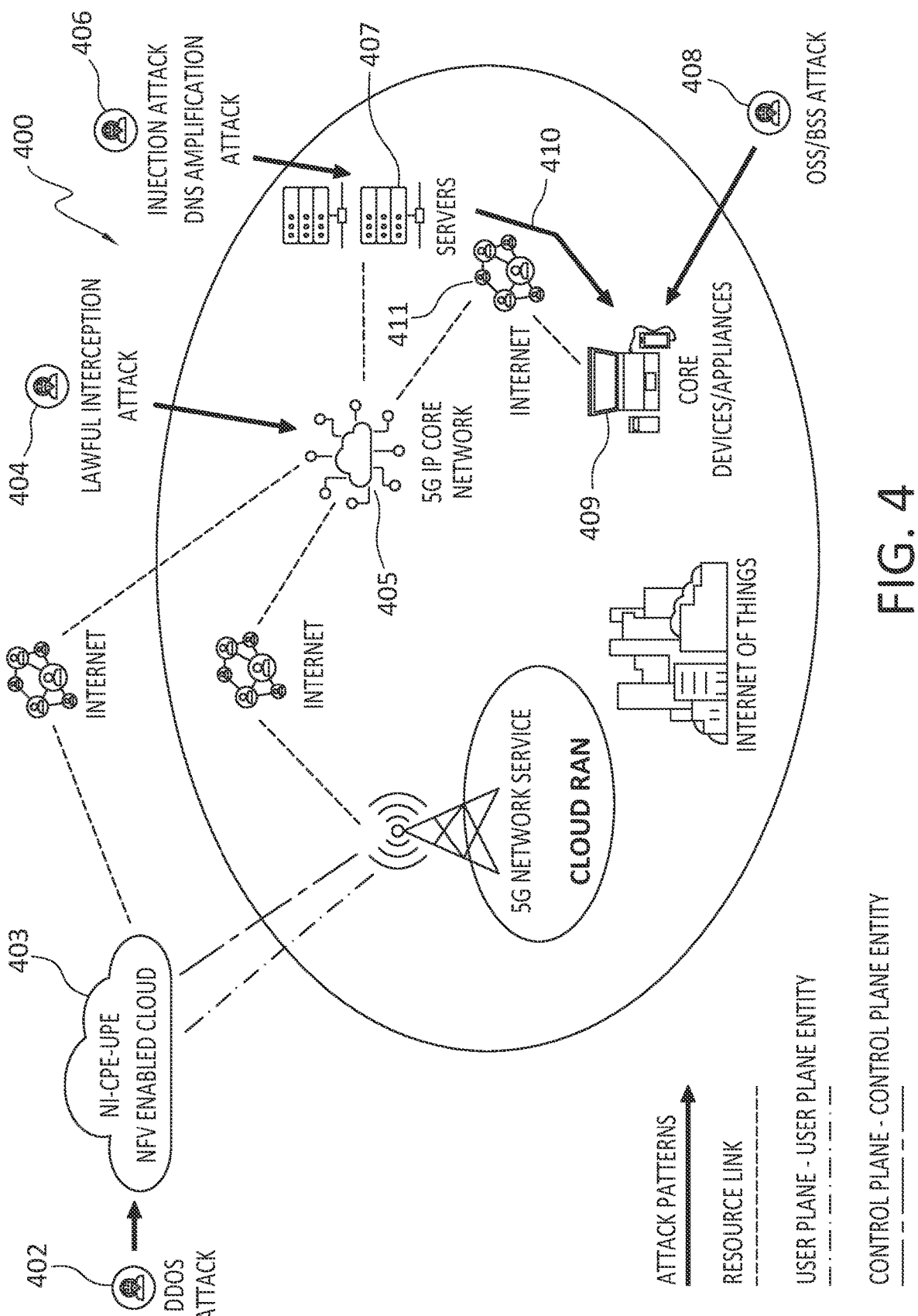
FIG. 4 discloses some potential attack patterns in a 5G network.

In connection with the information presented in the table 300, attention is directed now to FIG. 4 which discloses potential attack patterns that may be experienced or observed in a communication network 400, such as a 5G network for example. Except as may be noted hereafter, the communication network 400 may be similar, or identical, to the example 5G network 200 disclosed in FIG. 2, although that is not required, and the scope of the invention is not limited for use with any particular communication network configuration.

As shown in FIG. 4, one potential attack pattern is a DDOS (distributed denial of service) attack 402, which may be directed at an NFV enabled cloud environment 403. Another possible attack pattern is a lawful interception attack 404, which may be directed at an entity such as a 5G IP core network 405. Still another possible attack is an injection attack/DNS amplification attack 406, which may be directed at entities such as servers 407. Further, an OSS/BSS attack 408 may be directed at core devices/appliances 409 of the communication network 400. Thus far, the attacks noted are initiated external to the communication network 400. However, intra-network attacks 410 may take place as well. For example, malware or other malicious elements that have infected the servers 407 may be conveyed to the core devices/appliances 409 by way of the internet 411.

B. Detailed Discussion of an Example Embodiment

Figure 5:
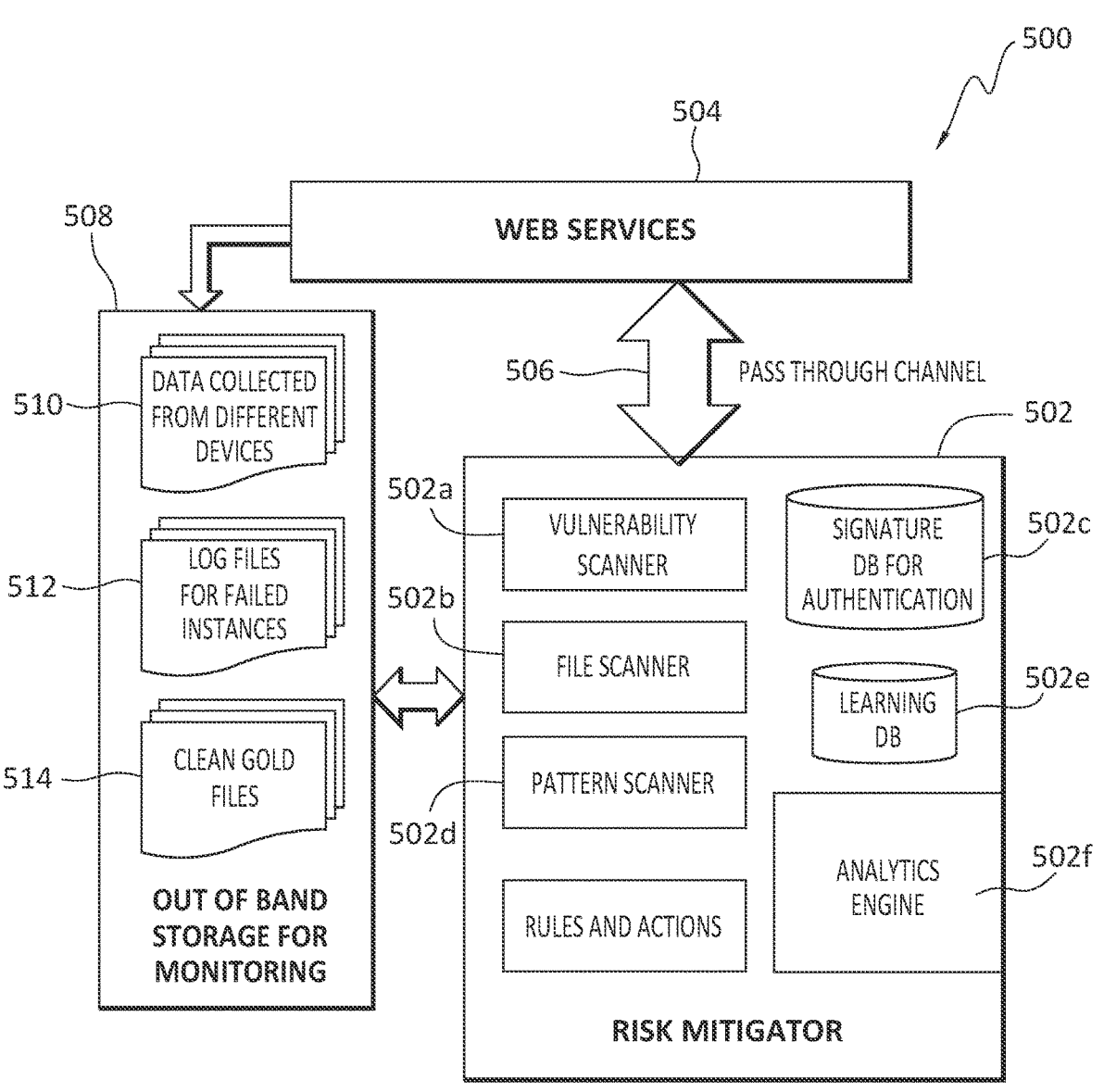
FIG. 5 discloses an architecture, and associated method, according to one example embodiment.
Figure 6:
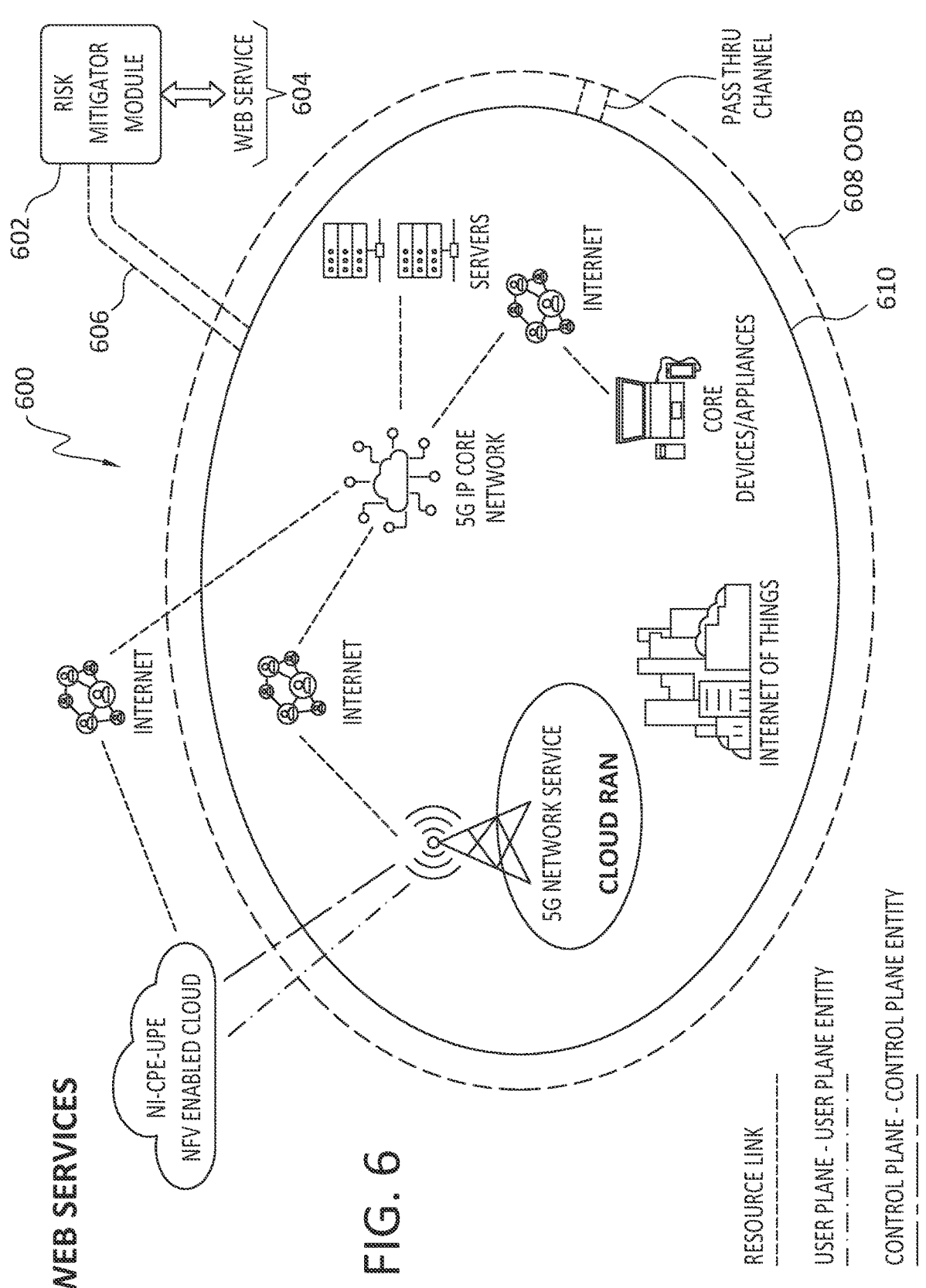
FIG. 6 discloses an example embodiment of a risk mitigator module deployed in a 5G environment as a web service.

With attention now to FIG. 5, an example architecture 500 according to one embodiment is disclosed, and attention is also directed to FIG. 6 which discloses an example environment 600 in which the architecture 500 may be implemented.

B.1 Architecture

In FIG. 5, the architecture 500 comprises a risk mitigator module (RMM) 502 (602 in FIG. 6) whose functionalities may be provided, as a web service 504 (604 in FIG. 6), to a communication network by way of a pass through channel 506 (606 in FIG. 6) extending from an OOB environment

608 to the communication network 610. Note that the communication network 610 may be similar, or identical, to the example 5G network 200 disclosed in FIG. 2, although that is not required. The architecture 500 may also comprise, in addition to the RMM 502, OOB storage 508 which may store files and other items for monitoring purposes. The various elements of the RMM 502 and OOB storage 508 are discussed hereafter.

In general, an example embodiment comprises an OOB method of scanning web server files and providing alerts based on rules and specific actions on files which may have been compromised. This is to ensure that any potential hacker will be unable reach to the core of the network. The RMM 502 may be hosted on a 5G service module which provides a security service to scan the files on a predetermined interval.

The RMM 502 can inform through an authenticated request to copy the necessary files for further scanning which are showing signs of any abnormal behavior/raising alerts/failing an operation. In an embodiment, the RMM 502 can send GET requests to check for any injection responses over the pass-through channel 506/606. This may be modified on authentication and privileged access to ensure that only the devices which are facing threats are targeted. When a request is received for file scan, the web page files 510 to be evaluated may be stored in the OOB storage 508, along with associated user access and error logs 512, for the monitoring system. The OOB storage 508 may also contain the pristine files 514, or 'clean gold files,' that are known to be free of any malicious code or other problems, may be used as a basis to check the web page files 510 for changes, and to determine if the web page files 510 have been compromised.

With continued attention to FIG. 5, the example RMM 502 may comprise various modules, components, and functionalities. For example, the RMM 502 comprises a vulnerability scanner 502*a* that may inject various SQL (structured query language), PHP (hypertext preprocessor) and base64 encoded code so as to emulate a hacking session which has been carried out in the past.

The example RMM 502 may also comprise a file scanner 502*b*. The file scanner 502*b* checks first for the access and error files. The file scanner 502*b* may match some of the attack vectors, stored in a signature DB 502*c*, which are associated with GET/POST/PATCH requests from malicious actors.

A pattern scanner 502*d* of the RMM 502 may check for modified attack vectors with a learning DB 502*e*. The learning DB 502*e* may be continuously appended with changing patterns. An analytics engine 502*f* of the RMM 502 may take calls on the updates of the learning DB 502*e*.

Finally, a rules and actions engine 502*f* may handle the notifications and requirement of quarantining any suspect files. In some cases, this can initiate the host to shut down web server services for a particular targeted device.

B.2 Learning

With further reference now to the learning DB 502*e*, also referred to as a 'vector database,' which may store various attack vectors, and/or information about the attack vectors, the vector database(s) may be continuously updated. In an embodiment, a respective vector database may be provided for each device that is being monitored for attacks. These vector databases may be updated, as part of a continuous learning process, to include observed vector attacks and information about them. In this way, the devices, systems, and software, may be kept up to date with defenses against various attacks. In an embodiment, a first device may be updated against an attack that was directed to a second device, but not to the first device. Thus, the continuous learning may be global over a population of devices, systems, and/or software.

In an embodiment, the vector databases may be created out of different devices which are connected or controlled under a specific 5G network. The pass-through channel 606 may be used to monitor any/all network instances which are showing signs of any abnormal behavior/raising alerts/failing an operation. In an embodiment, a vector database may be pre-populated with well known attack signature libraries, such as CWE (common weakness enumeration) and CVE (common vulnerabilities and exposures) for example.

Rules for dealing with attacks may be stored in a database, such as a vector database, which converts the standard snort (open-source network intrusion detection and prevention system—see//www.snort.org/) rules and signatures into regex (regular expression) patterns in XML or .json (JavaScript Object Notation) objects. Conversion may be implementation specific, and either manual or automatic conversion may be performed.

B.3 Analytics Block of RMM—Learning and Updating Pattern Matching

With reference now to FIG. 7, details are provided concerning learning and pattern matching, such as may be performed by an analytics block. One example of an analytics block is the analytics engine 502*f* discussed above. In the example table 700 of FIG. 7, various device details 702, such as IP address, are indicated. Threat types 704 known, and/or expected, to pose a threat are also disclosed, along with the time/date 706 of attacks that have occurred. The multiplicity of attacks 708, whether single or multiple may be disclosed as well. Finally, the effect of the attack on the device may be indicated by a device status 710 that indicates whether the device has failed, or is still operating.

Often, the attacks are distributed with slight modifications in patterns. In one example attack pattern, an attacker may attempt to reach '/etc/passwd,' by trying to fetch it through injections and having a distributed attack. Thus, an embodiment may learn suspect patterns and create a blacklist DB as it sees more and more cases. The blacklist DB may contain the IP addresses from which the attacks are being distributed, and the URLs that are being tried by the attack(s).

For website hacks, the file scanner (see 502*b* in FIG. 5) may check for the pattern differences in each file in addition to checking changed or new files. If unknown files are added, it is a straight flagging. However, hackers may overwrite known files, such as 'admin.php' for example, and embed innocuous-looking code in base64 encoded formats. Further, hackers may sometimes upload php files with .jpg or .png extensions, so that the files appear to be nonexecutable, and then try to execute those files.

Figure 8:
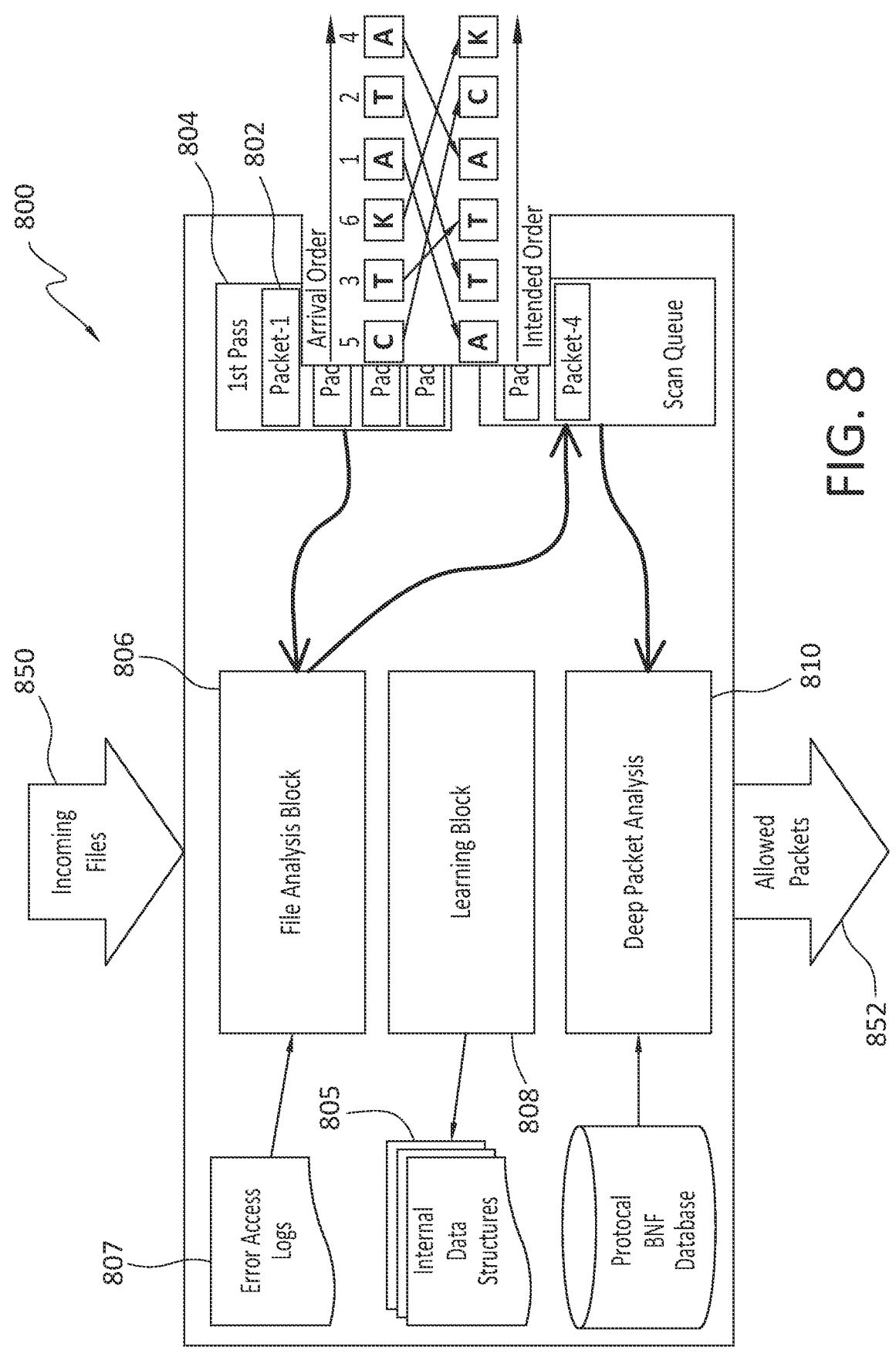
FIG. 8 discloses aspects of the structure and operation of an analytics block according to an embodiment.

With reference now to FIG. 8, further details are provided concerning an analytics block 800, also referred to herein as an 'analytics engine' (see 502*f* of FIG. 5). In general, the analytics block 800 may receive, as input, various files 850 that are to be analyzed. The files 850 may or may not be suspected as having been compromised. An output of the analytics block 800 may be packets 852 that the analytics block 800 has determined to be free of any problems. Following is a discussion of various operations and functionalities of the analytics block 800.

B.4 Detailed Discussion of Example Analytics Block

B.4.1 Identification and Mitigation of Attacks

Using the following example, an explanation is provided about a particular scenario where network/device are being impacted via forceful interventions through TCP and IP. This is a classic example where hackers are trying to take control by corrupting the target network/device by gaining control of any inbound packet data to the target network/device while the packet data is coming from an external source to this particular device using the given 5G network. In the same manner, an embodiment may create and/or comprise a customized algorithm for different kind of attack patterns.

B.4.2 Example Algorithm

Following is an example algorithm of the type mentioned in the previous section, and which may be implemented by an analytics block or analytics engine. References to elements of FIG. 8 appear thus [ . . . ].

For packet (i) from first pass queue [804]:
1. Initialize Cache data structure
2. Read User configuration: Set analysis flags (1=allpackets, 2=performance, 3=fuzzy)
    1. Allpackets: Indicate, all packets will be sent to IDS [806]. Recommended for super secure environment but very low performance of SP
    2. Performance: No IDS evaluation. Only first pass evaluation based on black- and whitelists
    3. Fuzzy: This is a decision-making block where the first pass evaluation will happen. This offers a mix of performance and security
3. Read whitelist/blacklist information
4. Decode TCP and IP header information
5. If information matches whitelist: pass the packet
6. If information matches blacklist: pass the packet to the IDS block
7. Else:
    1. Check for stored information from the internal cache and look for prospective match
    2. If TCP/IP header signature matches and is greater than expected packet incoming threshold forward to the learning block
    3. For each packet reaching the learning block
        i. The packet details are stored along with a state information where it notes the anomalies in the incoming packets
        ii. The same attack signature may come from different IP addresses, so storing the source IP is not enough. Understanding the signature and storing the state for the suspected packet.
        iii. The next packet may come after an interval bearing a similar signature but from a different IP
        iv. For each such packet increase the alert indicator number by the number of times the signature appears $A(N)+=Ai*N$ where N is number of packets and Ai is the initial alert indicator
        v. A suspected packet will be moved to the IDS queue. It will be allowed to pass through until the threshold is breached.
    4. The learning block will keep on updating the cache information based on the signature assessment.

The algorithm may look at firewall rules to see if only intended protocol packets directed at proper ports are received. Port scanning attacks will match signatures of attacks and the learning block will take actions. If the alert indicator crosses a predefined threshold the packets will be held back and passed on to the Intrusion detection block for complete analysis The learning block may be extended to update the blacklist/signaturedb on the event of matched signature so that the set of IP addresses are filtered at the beginning itself.

B.4.3 Automating Vector Pattern Analysis

With continued reference to the example of FIG. 8, various operations may be performed by the deep pattern analysis block 810 of the analytics block 800. These are discussed below.

One example embodiment is based on a passive automated mode of operation. The web files may be made available to the RMM in an offline mode and the operations of scanning are sequenced. Further, the vulnerability and file scanners may check for new or suspicious files and file pattern differences. The check can be based on the file modification dates and the network/device accessed. Following is an example procedure that may be performed by the deep pattern analysis block 810.

Open network/device access logs. Iterate through the access logs and check the accessed network/device and the pattern Filter the known (safe) IP addresses and skip them For unknown IP addresses scan the network/device

[see the example of FIG. 8*a*] if an unknown pattern occurs the network/device is flagged for deeper check. Expected operation: index.php/>

For each unknown pattern update suspect DB and add IP to blacklist DB

Check error.logs and check the errors generated for files

Open the file accessed in the network/device for checking for tampering.

Find the difference between active file and the pristine copy. If Difference is observed create a diff file and log and alert.

For the difference, check for patterns which are included in signature database.

Check for embedded signatures (e.g. base64decode( )) and perform regex matches and alert based on pattern matches.

With regard to implementation of the foregoing algorithm, various actions may be implemented. Following are definitions of some example actions that may be taken if a problem is known or suspected to have occurred: [1] the scanner block will perform the actions specified in the rule; [2] the action block can modify .htaccess files to limit IP addresses; [3] any discovered network/device will be quarantined, and administrators will be notified; and [4] administrator will be notified if a hack is discovered.

B.4.3 Attack Pattern Probabilistic Model

FIGS. 9*a*, 9*b* and 9*c*, collectively disclose an example algorithm that implements an attack pattern probabilistic model.

C. Example Methods

Figure 10:
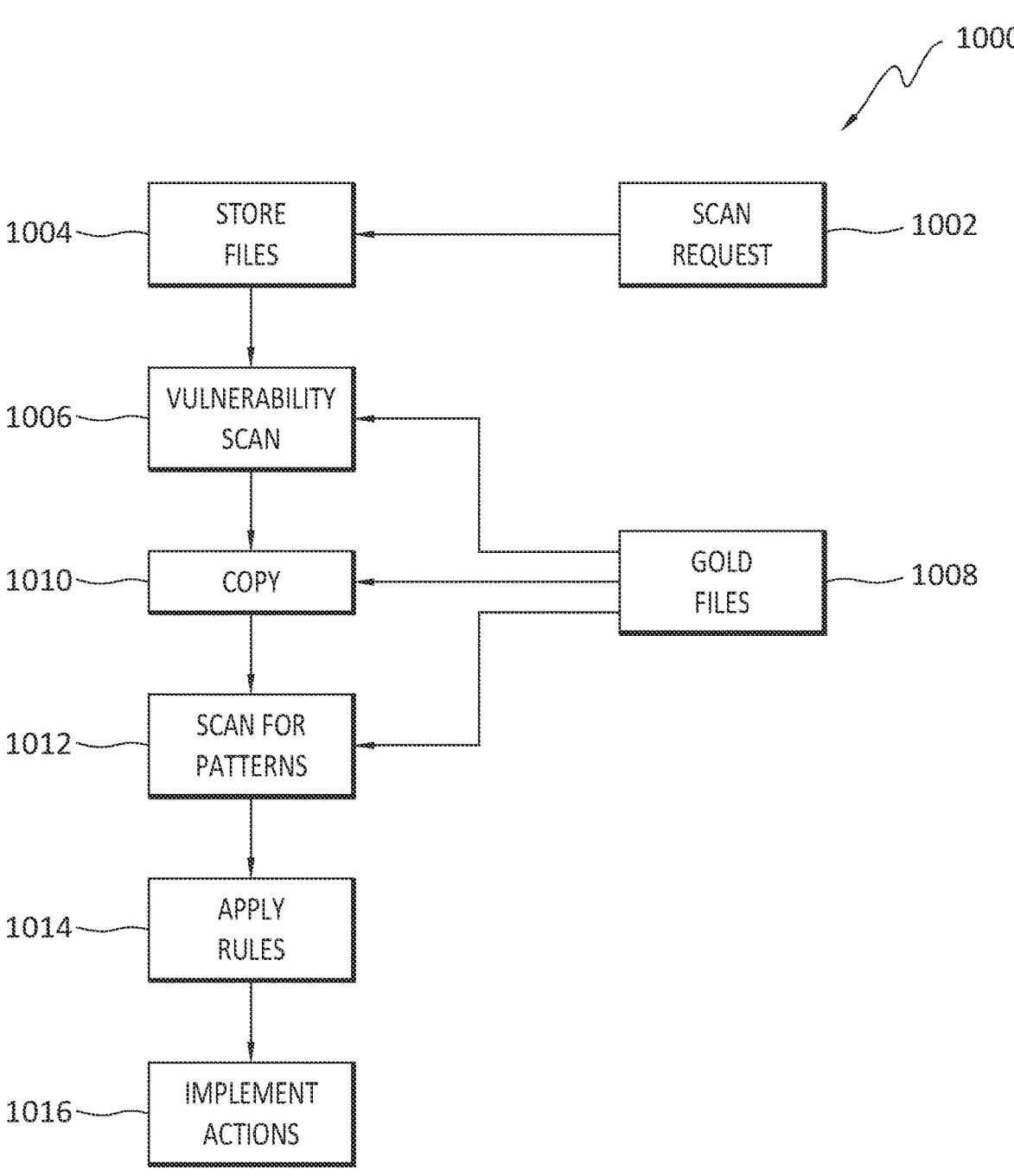
FIG. 10 discloses a method according to one example embodiment.

It is noted with respect to the disclosed methods, including the example method of FIG. 10, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 10, an example method according to one embodiment is referenced at 1000. In an embodiment, the method 1000 may be implemented in whole, or in part, by an RMM, examples of which are disclosed herein. Further, part, or all, of the method 1000 may be performed and provided (as-a-Service) to clients such as a communication network.

The example method 1000 may begin when a scan request is received 1002, such as by an RMM. The file(s) identified in the scan request may then be stored 1004. A vulnerability scan may then be performed 1006 of the files to determine whether or not the files may be vulnerable to attack. As part of the vulnerability scan 1006, reference may be made to a set of gold files 1008 to determine if the files being scanned differ from the gold files 1008.

As a result of the vulnerability scan 1006, it may be determined that one or more of the scanned files exhibits vulnerability to one or more types of attacks. These files may then be copied 1010 for further analysis.

After the files have been copied 1010, a scan may be performed 1012 to determine if any particular attack vectors are indicated in the files. As part of the pattern scan 1012, the gold files 1008 may be referenced for comparison to determine if the files indicate known attack vectors, or not. New patterns that are identified may be stored in a database.

When one or more attack patterns are noted in the files, one or more rules may be applied 1014 to determine which action(s) should be taken with respect to those files and/or with respect to the devices which received and/or originated the files. The actions may then be implemented 1016. Such actions may comprise, for example, quarantining the file(s) and/or any devices or systems known to have handled the files. Another example action is to prevent access to the communication network by the entity to which an attack was traced, or traceable. As a final example, a host may shut down web services for a particular device that was determined, based on the file analyses, to have been the target of the attack.

D. Further Discussion

Example embodiments may possess various useful aspects and features, although no embodiment is required to possess any of such aspects and features. Following are some examples.

In general, hacks occur in silence, and administrators are not aware of problems or an attack until much later, resulting in potential business and data loss. Thus, an embodiment may be implemented at a new trust boundary, that is, out of band with respect to the communication network, that is out of reach of hackers.

As another example, an embodiment may comprise an algorithm for learning attack patterns and selectively scanning incoming requests on any network/device connected to a 5G network. In the context of 5G, this disclosure may refer to any telecommunication related equipment as constituting a 'device.'

In a further example, an embodiment may comprise a scanner for 5G connected artefacts in a different trust boundary. That is, there are various ways disclosed herein to distinguish between suspect threats and non-suspicious routine behavior in order to assist the efficient use of any RMM on a 5G network. In-band scanners typically have an external agent that scans the entire corpus for signatures. Because, in an embodiment, the scanner is hosted in a RMM which may operate out-of-band, intelligent scanning may be employed to understand suspicious accesses.

Further, in an embodiment, dynamic and updated scanning may be implemented for any active 5G network at any time. Hacking attacks are typically dynamic, and a correlation must be established between attack patterns and the effects on data. To hide the (source code/entry path) attack, the hacker tries several packet types. A static code analysis is insufficient to link attack vectors to file alterations. Thus, the disclosed scanning and pattern learning algorithms on correlation between incoming attack patterns, together with access logs and screening for specific attack patterns, are also distinct and original in comparison to conventional threat scanners.

E. Further Example Embodiments

Following are some further example embodiments of the invention. These are presented only by way of example and are not intended to limit the scope of the invention in any way.

Embodiment 1. A method, comprising: receiving a request to scan a file; storing the file; performing a vulnerability scan on the file; based on an outcome of the vulnerability scan, making a copy of the file; scanning the copy of the file; when the scanning identifies an attack pattern, applying a rule concerning the attack pattern; and performing a remedial action specified by the rule with respect to the file and/or with respect to a device that handled the file.

Embodiment 2. The method as recited in any preceding embodiment, wherein the file is associated with a request that was incoming to a device on a 5G communication network.

Embodiment 3. The method as recited in any preceding embodiment, wherein the scanning is performed in a trust boundary outside of a communication network with which the file is associated.

Embodiment 4. The method as recited in any preceding embodiment, wherein the request to scan the file is an automated request.

Embodiment 5. The method as recited in any preceding embodiment, wherein the attack pattern is a new attack pattern not previously identified, and the new attack pattern is stored in a database.

Embodiment 6. The method as recited in any preceding embodiment, wherein the vulnerability scan and the scanning of the copy of the file are provided as a web service to a client.

Embodiment 7. The method as recited in any preceding embodiment, wherein the vulnerability scan and the scanning of the copy of the file are performed by a risk mitigation module, operating out of band with respect to a 5G communication network, that communicates with the 5G communication network by way of a pass through channel.

Embodiment 8. The method as recited in any preceding embodiment, wherein the vulnerability scan and the scanning of the copy of the file are performed with regard to a device which is associated with the file and that is included in a network that further includes a network functions virtualization device whose security requirements differ from security requirements of a legacy device that is included in the network.

Embodiment 9. The method as recited in any preceding embodiment, wherein the attack pattern relates to an attack initiated external to a communications network to which the attack was directed.

Embodiment 10. The method as recited in any preceding embodiment, wherein a trusted boundary is created outside of a communications network, and the trusted boundary prevents a user from accessing the communications network unless the scanning reveals that the file has not been compromised.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
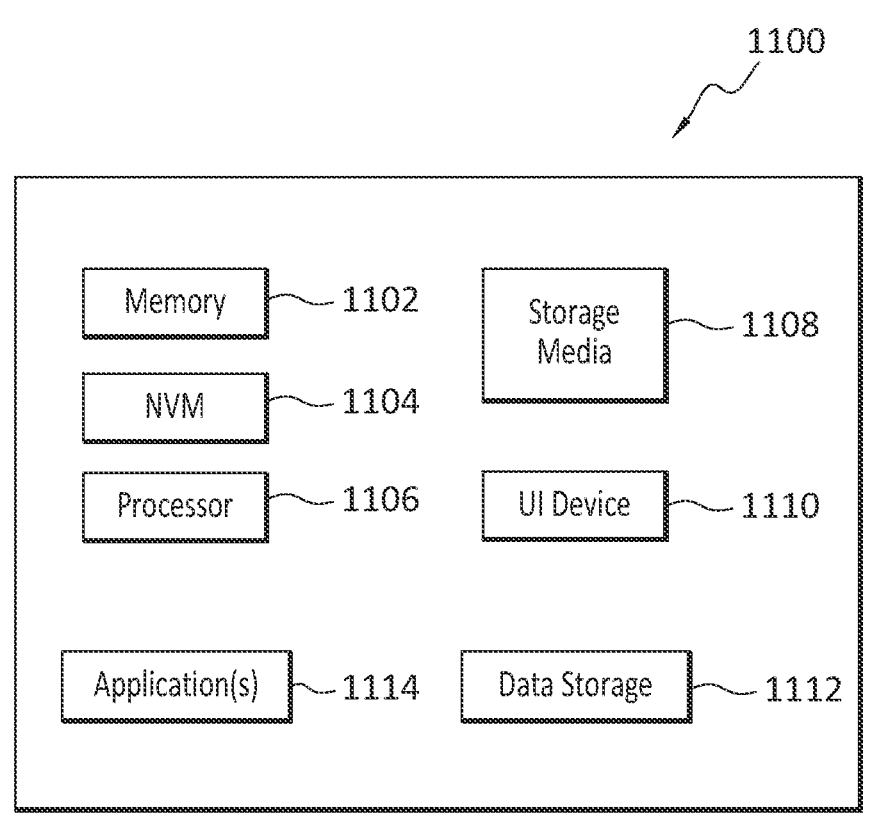
FIG. 11 discloses a computing entity operable to perform any of the disclosed methods, processes, and operations.

With reference briefly now to FIG. 11, any one or more of the entities disclosed, or implied, by FIGS. 1-10, and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1106 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a request to scan a file;
storing the file;
performing a vulnerability scan on the file;
based on an outcome of the vulnerability scan, making a
copy of the file;
scanning the copy of the file;
when the scanning identifies an attack pattern, applying a
rule concerning the attack pattern; and
performing a remedial action specified by the rule with
respect to the file and/or with respect to a device that
handled the file.

2. The method as recited in claim 1, wherein the file is
associated with a request that was incoming to a device on
a 5G communication network.

3. The method as recited in claim 1, wherein the scanning
is performed in a trust boundary outside of a communication
network with which the file is associated.

4. The method as recited in claim 1, wherein the request
to scan the file is an automated request.

5. The method as recited in claim 1, wherein the attack
pattern is a new attack pattern not previously identified, and
the new attack pattern is stored in a database.

6. The method as recited in claim 1, wherein the vulner-
ability scan and the scanning of the copy of the file are
provided as a web service to a client.

7. The method as recited in claim 1, wherein the vulner-
ability scan and the scanning of the copy of the file are
performed by a risk mitigation module, operating out of
band with respect to a 5G communication network, that
communicates with the 5G communication network by way
of a pass through channel.

8. The method as recited in claim 1, wherein the vulner-
ability scan and the scanning of the copy of the file are
performed with regard to a device which is associated with
the file and that is included in a network that further includes
a network functions virtualization device whose security
requirements differ from security requirements of a legacy
device that is included in the network.

9. The method as recited in claim 1, wherein the attack
pattern relates to an attack initiated external to a communi-
cations network to which the attack was directed.

10. The method as recited in claim 1, wherein a trusted
boundary is created outside of a communications network,
and the trusted boundary prevents a user from accessing the
communications network unless the scanning reveals that
the file has not been compromised.

11. A non-transitory storage medium having stored therein
instructions that are executable by one or more hardware
processors to perform operations comprising:

receiving a request to scan a file;
storing the file;
performing a vulnerability scan on the file;
based on an outcome of the vulnerability scan, making a
copy of the file;
scanning the copy of the file;
when the scanning identifies an attack pattern, applying a
rule concerning the attack pattern; and
performing a remedial action specified by the rule with
respect to the file and/or with respect to a device that
handled the file.

12. The non-transitory storage medium as recited in claim
11, wherein the file is associated with a request that was
incoming to a device on a 5G communication network.

13. The non-transitory storage medium as recited in claim
11, wherein the scanning is performed in a trust boundary
outside of a communication network with which the file is
associated.

14. The non-transitory storage medium as recited in claim
11, wherein the request to scan the file is an automated
request.

15. The non-transitory storage medium as recited in claim
11, wherein the attack pattern is a new attack pattern not
previously identified, and the new attack pattern is stored in
a database.

16. The non-transitory storage medium as recited in claim
11, wherein the vulnerability scan and the scanning of the
copy of the file are provided as a web service to a client.

17. The non-transitory storage medium as recited in claim
11, wherein the vulnerability scan and the scanning of the
copy of the file are performed by a risk mitigation module,
operating out of band with respect to a 5G communication
network, that communicates with the 5G communication
network by way of a pass through channel.

18. The non-transitory storage medium as recited in claim
11, wherein the vulnerability scan and the scanning of the
copy of the file are performed with regard to a device which
is associated with the file and that is included in a network
that further includes a network functions virtualization
device whose security requirements differ from security
requirements of a legacy device that is included in the
network.

19. The non-transitory storage medium as recited in claim
11, wherein the attack pattern relates to an attack initiated
external to a communications network to which the attack
was directed.

20. The non-transitory storage medium as recited in claim
11, wherein a trusted boundary is created outside of a
communications network, and the trusted boundary prevents
a user from accessing the communications network unless
the scanning reveals that the file has not been compromised.

* * * * *